(12) United States Patent
Ide

(10) Patent No.: US 7,576,641 B2
(45) Date of Patent: Aug. 18, 2009

(54) IDENTIFICATION INFORMATION EXAMINATION METHOD AND INFORMATION OBTAINING APPARATUS

(75) Inventor: Nobuhiro Ide, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 275 days.

(21) Appl. No.: 10/903,385

(22) Filed: Aug. 2, 2004

(65) Prior Publication Data

US 2005/0024194 A1    Feb. 3, 2005

(30) Foreign Application Priority Data

Jul. 31, 2003    (JP)    ............... 2003-204557

(51) Int. Cl.
*B60C 23/00*    (2006.01)
(52) U.S. Cl. .................. 340/447; 340/445; 73/146.5
(58) Field of Classification Search ................. 340/445, 340/447, 539.1; 73/146.5, 146.2
See application file for complete search history.

(56) References Cited

U.S. PATENT DOCUMENTS

| | | | |
|---|---|---|---|
| 119,780 A | 10/1871 | Kusunoki et al. | |
| 4,734,674 A | 3/1988 | Thomas et al. | |
| 5,365,225 A | 11/1994 | Bachhuber | |
| 5,880,363 A * | 3/1999 | Meyer et al. | ................ 73/146.5 |
| 6,317,882 B1 * | 11/2001 | Robbins | ....................... 725/34 |
| 6,340,930 B1 | 1/2002 | Lin | |
| 6,362,731 B1 | 3/2002 | Lill | |
| 6,476,712 B1 | 11/2002 | Achterholt | |
| 6,745,623 B2 | 6/2004 | Schmitt | |
| 6,919,789 B2 * | 7/2005 | Lin | ............................ 336/198 |
| 2001/0050611 A1 | 12/2001 | Achterholt | |
| 2003/0000296 A1 | 1/2003 | Schmitt | |
| 2003/0110851 A1 | 6/2003 | Tsujita | |
| 2003/0179082 A1 * | 9/2003 | Ide | ........................... 340/425.5 |
| 2006/0003789 A1 * | 1/2006 | Murata et al. | ................ 455/522 |

FOREIGN PATENT DOCUMENTS

| | | |
|---|---|---|
| DE | 198 39 478 A1 | 3/2000 |
| DE | 199 26 616 C2 | 12/2000 |
| DE | 199 51 273 A1 | 6/2001 |
| DE | 100 14 076 A1 | 10/2001 |
| EP | 1 026 015 A2 | 8/2000 |
| EP | 1 059 177 | 12/2000 |
| JP | A 04-505193 | 9/1992 |
| JP | A 7-507513 | 8/1995 |
| JP | A 9-210827 | 8/1997 |
| JP | A 2000-142044 | 5/2000 |
| JP | A 2000-153703 | 6/2000 |
| JP | A 2000-233615 | 8/2000 |
| JP | A 2000-238515 | 9/2000 |
| JP | A 2003-267007 | 9/2003 |
| WO | WO 03/093074 A1 | 11/2003 |

* cited by examiner

*Primary Examiner*—Jeffery Hofsass
(74) *Attorney, Agent, or Firm*—Oliff & Berridge, PLC

(57) ABSTRACT

In an identification information examination mode, reception sensitivity of a reception device in an information obtaining mode is reduced. In the reception device, information transmitted from a transmission device mounted in a vehicle adjacent to the host vehicle is not received, and identification information transmitted from a transmission device mounted in the host vehicle is received. Then, an examination is performed by comparing the received identification information with the identification information stored in memory in advance.

13 Claims, 7 Drawing Sheets

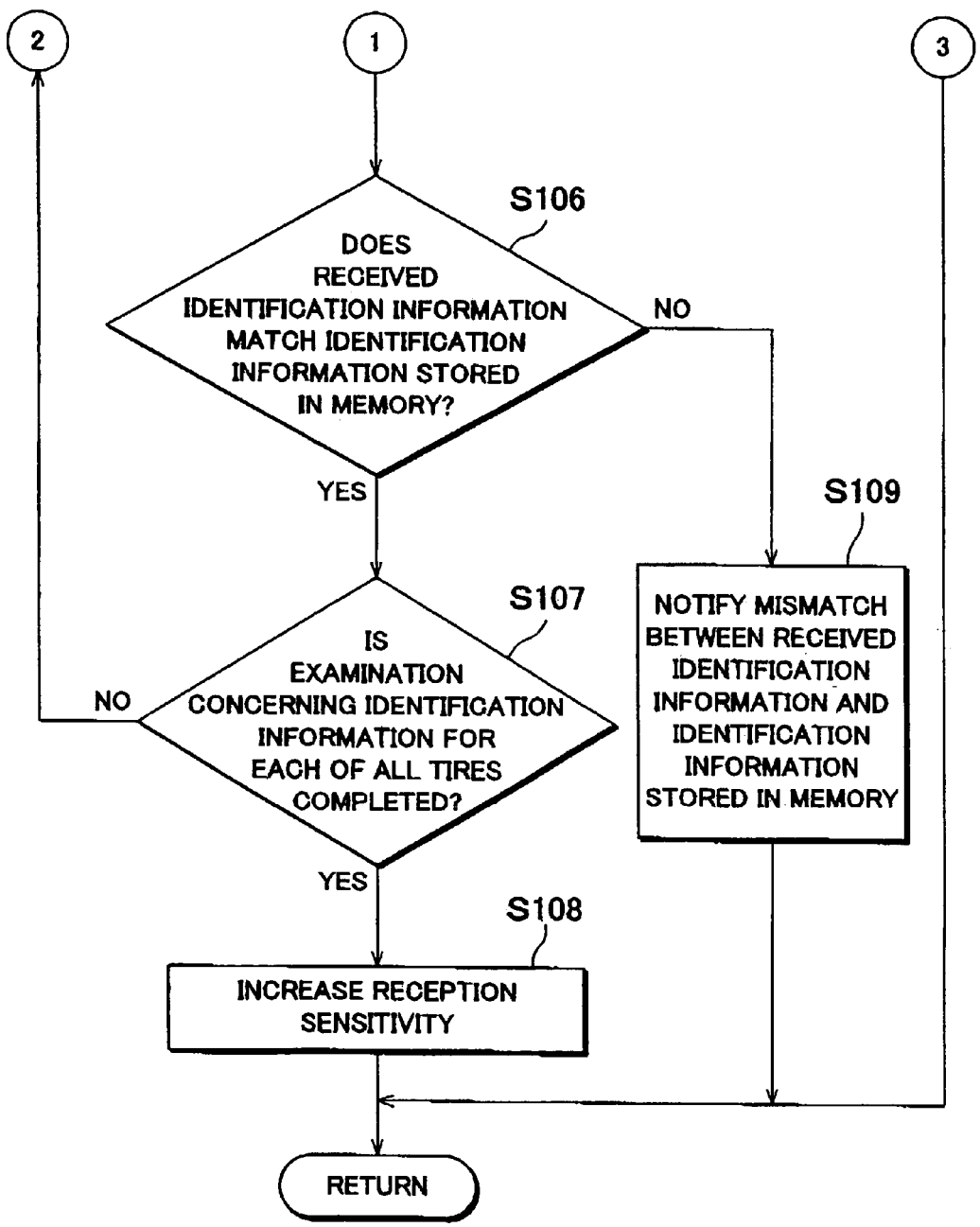

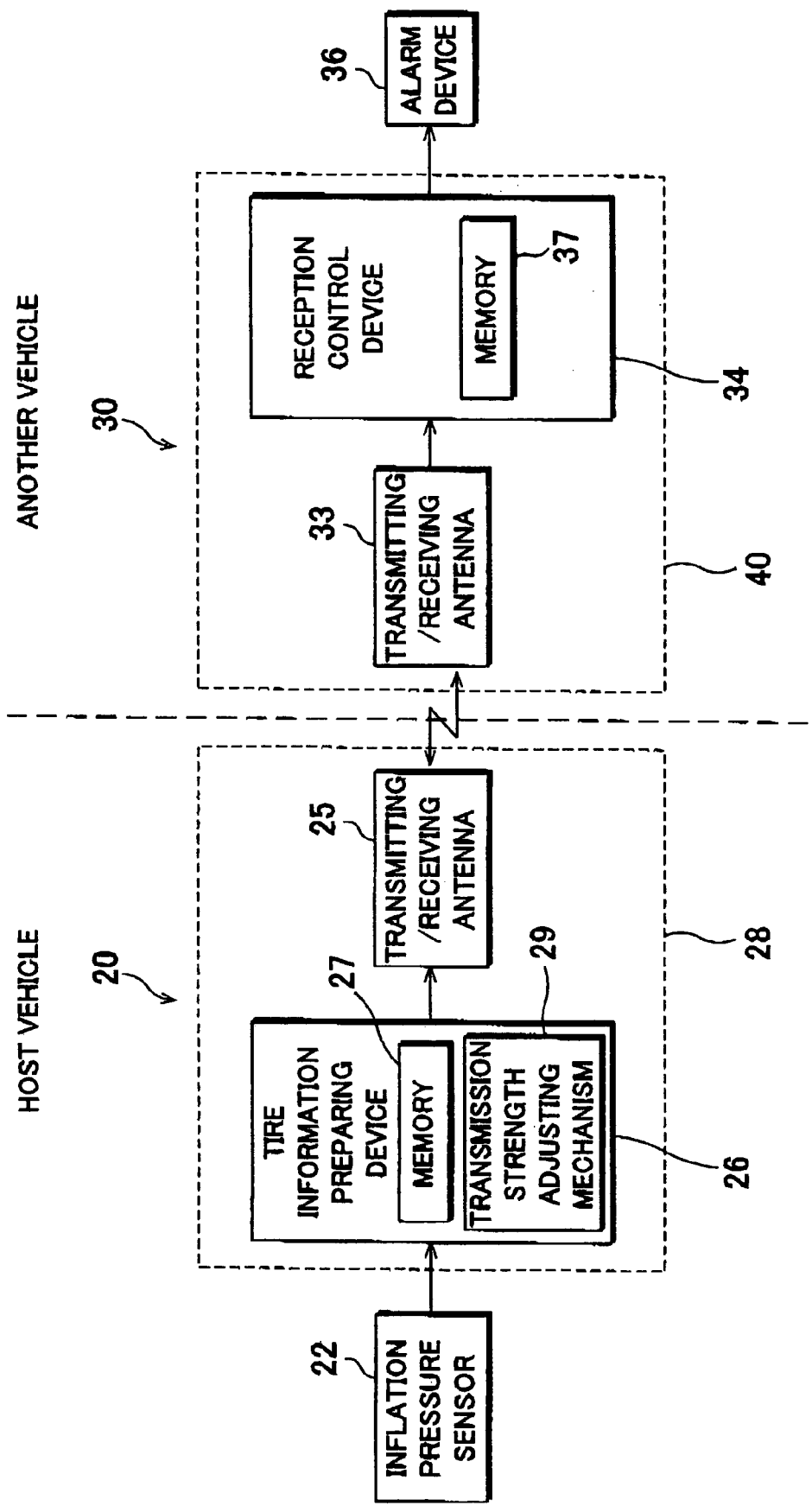

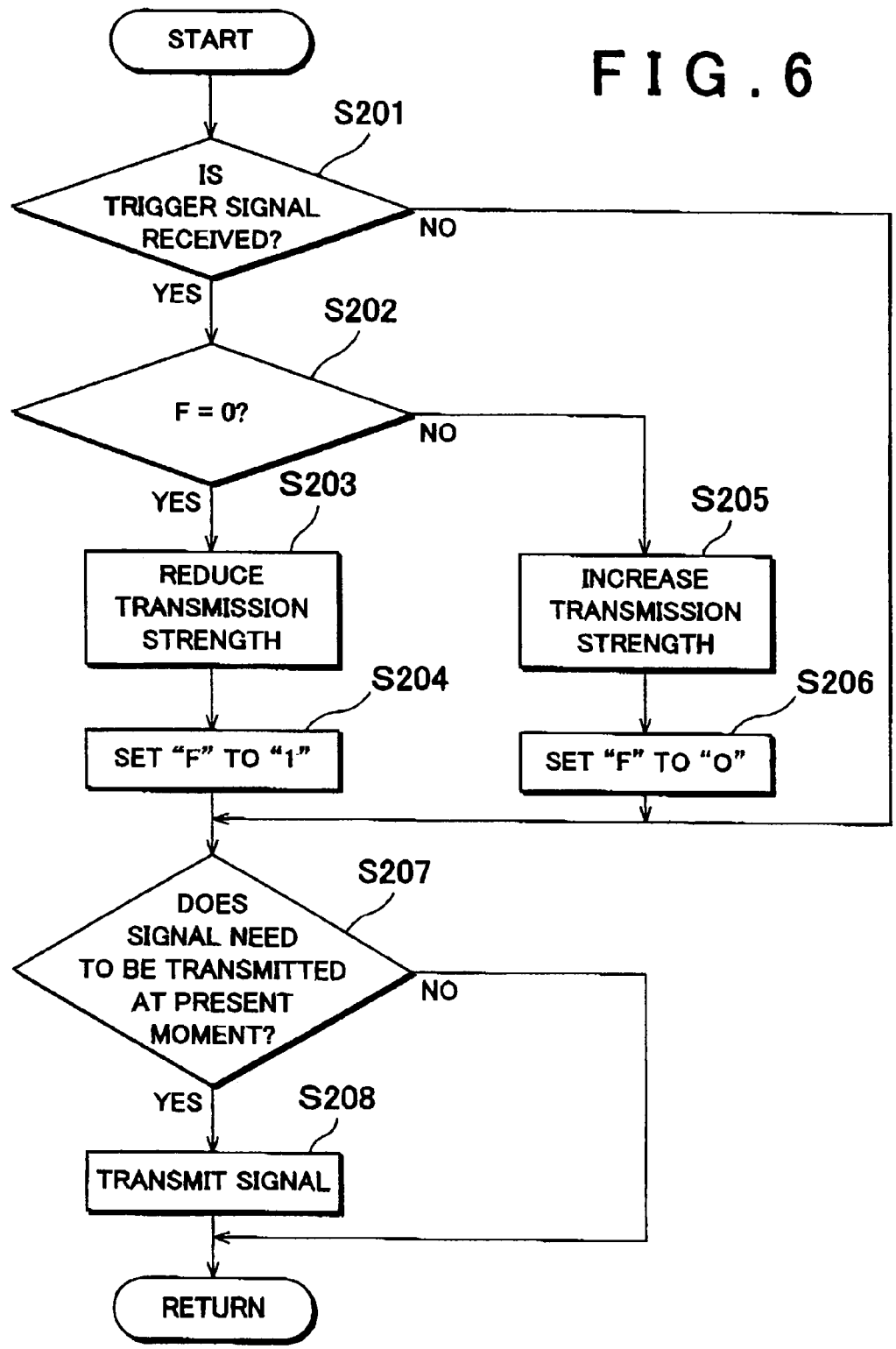

IDENTIFICATION INFORMATION EXAMINATION METHOD AND INFORMATION OBTAINING APPARATUS

INCORPORATION BY REFERENCE

The disclosure of Japanese Patent Application No. 2003-204557 filed on Jul. 31, 2003, including the specification, drawings and abstract is incorporated herein by reference in its entirety.

BACKGROUND OF THE INVENTION

1. Field of the Invention

The invention relates to an information obtaining apparatus used for a vehicle. More particularly, the invention relates to an examination concerning identification information.

2. Description of the Related Art

A tire inflation pressure alarm apparatus is widely known, which determines whether a tire inflation pressure is an abnormal value based on a radio signal including a measurement value of the tire inflation pressure, and which issues an alarm when the tire inflation pressure is determined to be an abnormal value. Such a tire inflation pressure alarm apparatus includes a transmission device which is provided in each tire, and a reception device which receives a radio signal transmitted from the transmission device.

The transmission device measures a tire inflation pressure, and wirelessly transmits the measurement value and tire identification information ID for identifying the tire. The reception device receives the radio signal transmitted from the transmission device, and determines whether an abnormality has occurred in the tire inflation pressure. The tire identification information ID for each of all the tires of the vehicle is registered on the memory of the reception device in advance. The reception device determines whether the tire inflation pressure information included in the received radio signal is for the host vehicle, by comparing the tire identification information ID included in the received radio signal with the tire identification information ID registered on the memory. The tire identification information ID is registered on the memory when the tire is attached to the vehicle.

For example, Japanese Patent Laid-Open Publication No. JP A 2000-233615 discloses a technology in which communication is performed for a predetermined set time, and the identification information which is most frequently received is registered as the identification information transmitted from a transmission device provided in a tire of a host vehicle. Japanese Patent Laid-Open Publication No. JP A 09-210827 discloses a technology in which a reception device registers the initially received identification information for each of four wheels, as the identification information transmitted from a transmission device provided in each tire of a host vehicle.

In the above-mentioned technologies, generally, an output from the transmission device is set to have sufficient strength with respect to the reception sensitivity of the reception device, in order to perform reliable communication between the transmission device and the reception device using a radio signal. Therefore, the reception device may receive a radio signal from a transmission device provided in a wheel attached to another vehicle.

After the identification information from the transmission device is registered when the tire is attached to the vehicle, it is necessary to perform an examination of whether the identification information corresponding to the attached tire is registered properly (hereinafter, this examination will be referred to as an "examination concerning the identification information"). However, when the examination concerning the identification information is performed at a place, e.g., a vehicle production plant, where many vehicles are densely placed, there is a high possibility that the reception device receives a radio signal transmitted from a transmission device mounted in another vehicle. When the examination is attempted to be performed concerning the identification information from the transmission device provided in the host vehicle, the examination may be accidentally performed concerning the identification information from the transmission device mounted in the other vehicle. This causes a problem that the examination concerning the identification information cannot be performed accurately.

SUMMARY OF THE INVENTION

It is an object of the invention to provide an identification information examination method and an information obtaining apparatus, for a vehicle performing an examination concerning identification information, the method and the apparatus being capable of appropriately avoiding reception of a signal transmitted from a transmission device mounted in another vehicle adjacent to the vehicle, and being capable of accurately performing the examination concerning the identification information.

A first aspect of the invention relates to an identification information examination method for an information obtaining apparatus which is mounted in a vehicle and which includes (a) a transmission device that transmits information including vehicle related information which is related to the vehicle and identification information based on which a transmission source of the vehicle related information can be identified; (b) a reception device that receives the information transmitted from the transmission device; and (c) an information processing device that processes the information received by the reception device and that performs an examination concerning the identification information included in the received information in an identification information examination state. In this method, when the information processing device is in the identification information examination state, a reception specification is changed from a first reception specification which is used when an examination concerning the identification information is not performed to a second reception specification which is used when the examination concerning the identification information is performed.

According to the first aspect, when the information processing device is in the identification information examination state, the reception specification (e.g., reception sensitivity and orientation of a receiving antenna provided in the reception device) of the reception device is changed from the first reception specification which is used when the examination concerning the identification information is not performed to the second reception specification which is used when the examination concerning the identification information is performed. For example, in the state where transmission strength of a signal transmitted from the transmission device mounted in a host vehicle is substantially equal to that from a transmission device mounted in another vehicle adjacent to the host vehicle, if the reception sensitivity of the reception device mounted in the host vehicle is reduced to the lower limit of the range in which signals transmitted from the transmission device mounted in the host vehicle can be received, the signal transmitted from the transmission device mounted in the host vehicle can be received while reception of signals transmitted from the transmission device mounted in the other vehicle can be suppressed. Accordingly, it is possible to avoid performing the examination concerning the identification information from the transmission device of the other vehicle, and therefor accurately perform the examination concerning the identification information in a short time. The identification information examination state is a state where an examination is performed concerning the identification information included in the signal transmitted from the transmission device. In the identification information examination state, the vehicle related information may not be able to be obtained. Also, the vehicle related information may be able to be obtained when the examination concerning the identification information is being performed.

A second aspect of the invention relates to an information obtaining apparatus which is mounted in a vehicle and which includes (a) a transmission device that transmits information including vehicle related information which is related to the vehicle and identification information based on which a transmission source of the vehicle related information can be identified; (b) a reception device that receives the information transmitted from the transmission device; and (c) an information processing device that processes the information received by the reception device and that performs an examination concerning the identification information included in the received information in an identification information examination state. The information obtaining apparatus includes a changing device. When the information processing device is in the identification information examination state, the changing device changes a reception specification of the reception device from a first reception specification which is used when an examination concerning the identification information is not performed to a second reception specification which is used when the examination concerning the identification information is performed.

A third aspect of the invention relates to an identification information examination method for an information obtaining apparatus which is mounted in a vehicle and which includes (a) a transmission device that transmits information including vehicle related information which is related to the vehicle and identification information based on which a transmission source of the vehicle related information can be identified; (b) a reception device that receives the information transmitted from the transmission device; and (c) an information processing device that processes the information received by the reception device and that performs an examination concerning the identification information included in the received information in an identification information examination state. In this method, when the information processing device is in the identification information examination state, the transmission strength of a transmission device mounted in another vehicle adjacent to the vehicle is reduced.

According to the third aspect, when there is a vehicle in the identification information examination state, the transmission strength of the transmission device mounted in another vehicle adjacent to the vehicle is reduced. Therefore, the vehicle in the identification information examination state does not receive the information from the transmission device mounted in the other vehicle adjacent to the vehicle. As a result, it is possible to accurately perform the examination concerning the identification information.

A fourth aspect of the invention relates to an information obtaining apparatus which is mounted in a vehicle and which includes (a) a first transmission device that transmits information including vehicle related information which is related to the vehicle and identification information based on which a transmission source of the vehicle related information can be identified; (b) a reception device that receives the information transmitted from the first transmission device; and (c) an information processing device that processes the information received by the reception device and that performs an examination concerning the identification information included in the received information in an identification information examination state. In the identification information examination state, the information processing device reduces the transmission strength of a second transmission device mounted in another vehicle adjacent to the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 4A and 4B are a flowchart showing a reception control program stored in memory of a reception control device of the information obtaining apparatus according to the first embodiment of the invention;

FIG. 5 is an overall view of an information obtaining apparatus according to a second embodiment of the invention; and FIG. 6 is a flowchart showing a reception control program stored in memory of a tire information preparing device of the information obtaining apparatus according to the second embodiment of the invention.

DETAILED DESCRIPTION OF THE PREFERRED EMBODIMENTS

An identification information examination method and an information obtaining apparatus according to a first embodiment of the invention will be described in detail with reference to accompanying drawings. The information obtaining apparatus according to the embodiment is applied to a tire inflation pressure alarm apparatus which obtains tire inflation pressure information transmitted from a transmission device provided in a wheel while a vehicle is running, and which issues an alarm indicating an abnormality in the tire inflation pressure.

Figure 1:
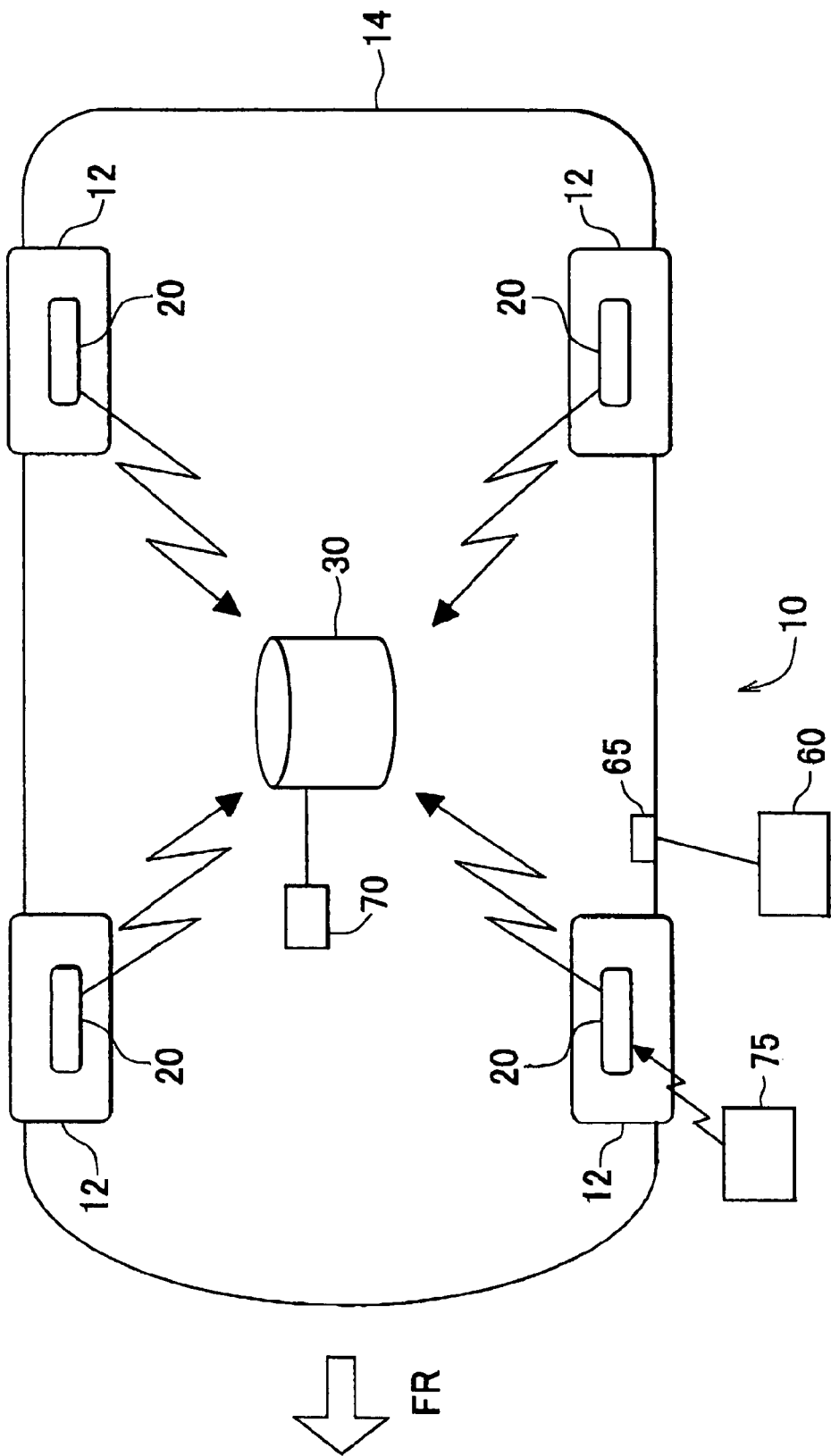
FIG. 1 is an overall view of a vehicle in which an information obtaining apparatus according to an embodiment of the invention is mounted.
Figure 2:
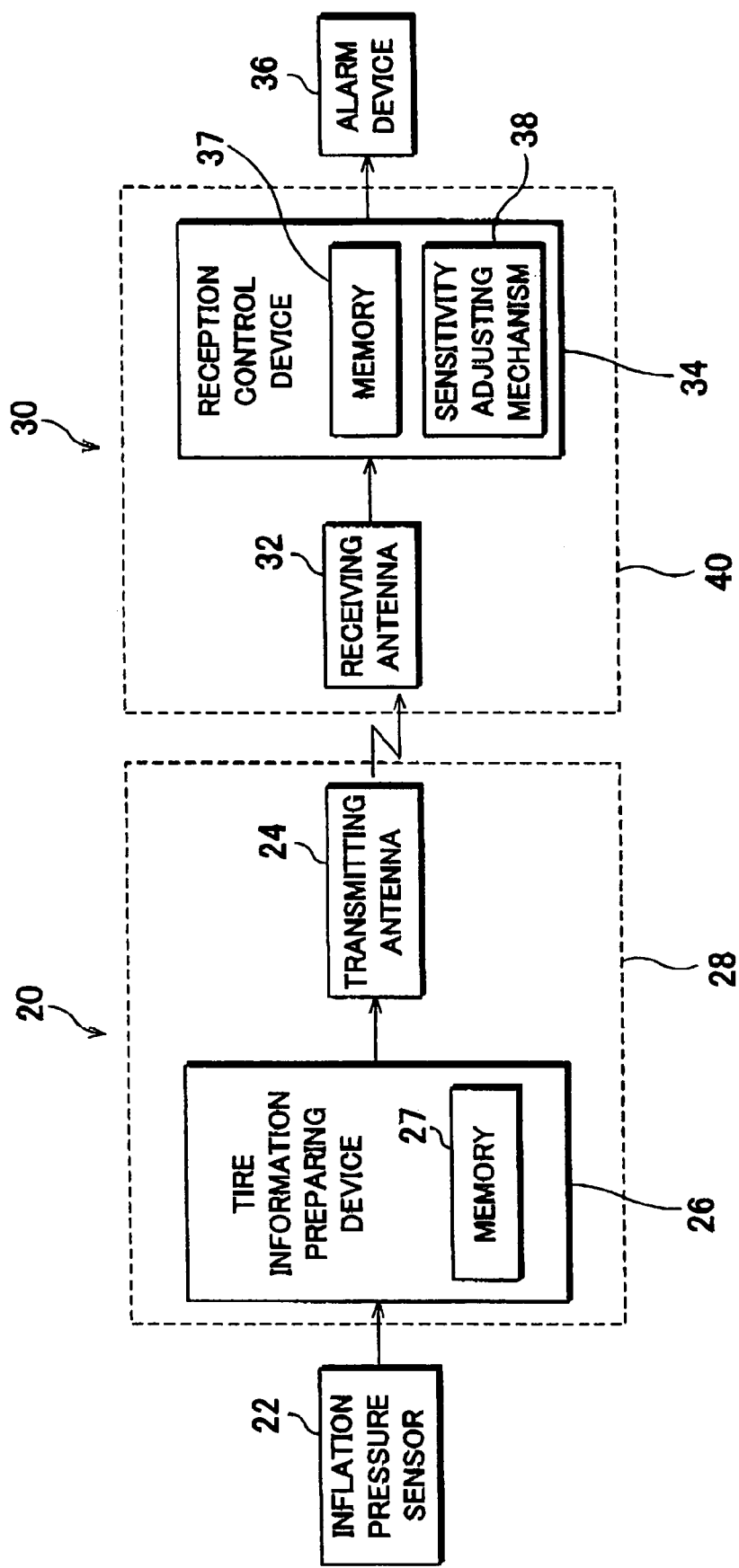
FIG. 2 is an overall view showing the information obtaining apparatus according to a first embodiment of the invention.

In FIGS. 1 and 2, a wheel side device 20 is provided in each of four wheels 12 which are provided in a right front position, a left front position, a right rear position, and a left rear position of a vehicle 10, respectively. A vehicle body side device 30 is provided in a vehicle body 14. Communication is performed between each wheel side device 20 and the vehicle body side device 30.

As shown in FIG. 2, the wheel side device 20 includes an inflation pressure sensor 22 which detects a tire inflation pressure of the wheel 12; a transmitting antenna 24 which transmits tire information as a series of wheel information including inflation pressure information indicating the inflation pressure detected by the inflation pressure sensor 22 and identification information for identifying the wheel; and a tire information preparing device 26 which prepares a series of tire information. The tire information preparing device 26 mainly includes a computer. The inflation pressure sensor 22 is connected to an input portion of the tire information preparing device 26, and the transmitting antenna 24 is connected to an output portion of the tire information preparing device 26. The above-mentioned identification information and the like are stored in memory 27, e.g., ROM and RAM. In the embodiment, a transmission device 28 is constituted of the transmitting antenna 24 and the tire information preparing device 26.

Figure 3:
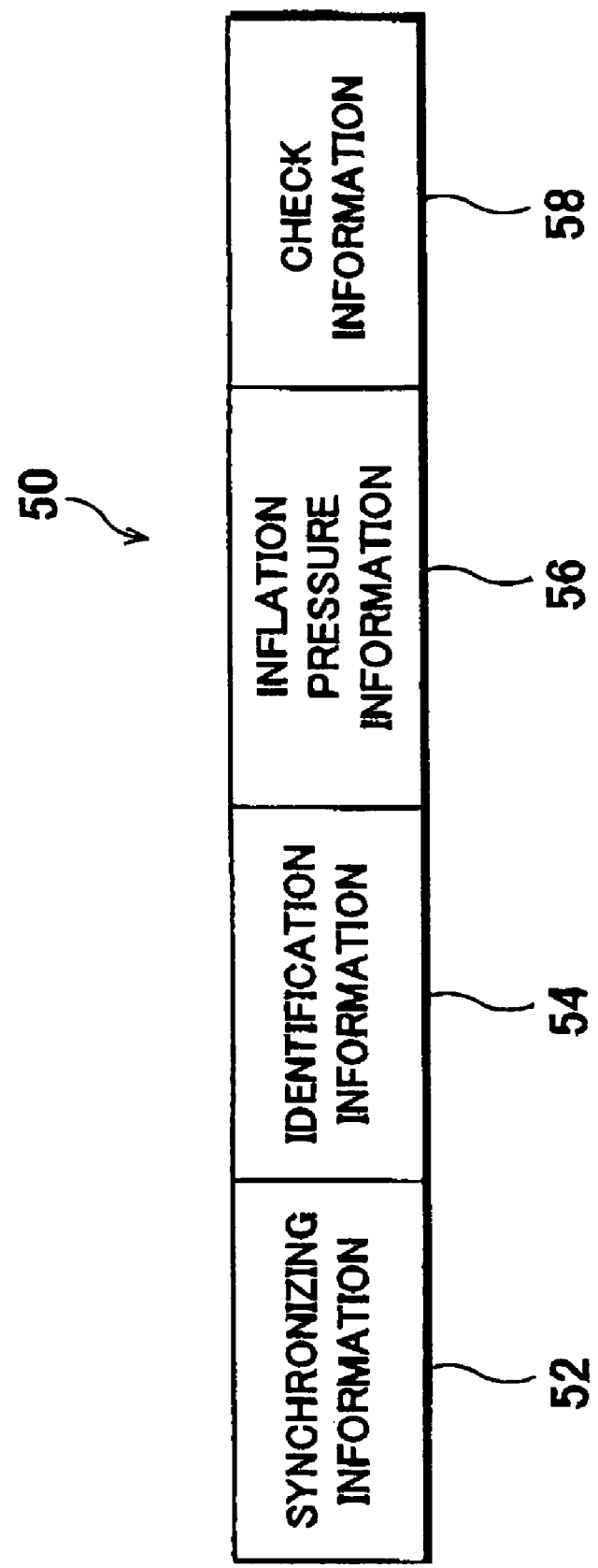
FIG. 3 is a diagram schematically showing tire information transmitted from a transmission device.

FIG. 3 is a diagram schematically showing a frame structure of the tire information transmitted from the transmission device 28. Tire information 50 includes synchronizing information 52, identification information 54, inflation pressure information 56, check information 58 and the like. The synchronizing information 52 is located at the head of the tire information 50, and is transmitted for synchronization with the reception device. The identification information 54 is assigned to each of the wheels 12. The identification information 54 is provided in order to identify that the wheel 12 is included in the host vehicle, and is not included in another vehicle. The check information 58 is used for parity check and the like.

In the embodiment, the inflation pressure is the vehicle related information. In addition to the inflation pressure information, the vehicle related information may include tire temperature information indicating a temperature of a tire, application force information indicating front-and-rear direction force, vertical direction force, and right-and-left direction force applied to the wheels, form information indicating a form of the tire, information indicating the state of the wheel side device 20 (e.g., information indicating the remaining capacity of a battery for the wheel side device 20), and the like. In the embodiment, the transmission device is constituted of the transmitting antenna and the tire information preparing device. However, instead of the tire information preparing device, a device which prepares vehicle related information other than the information related to the tire may be used. In this case, the vehicle related information is not limited to information related to the wheels.

In the wheel side device 20, the inflation pressure of the tire 12 is detected by the inflation pressure sensor 22 at intervals of a first predetermined set time, and is stored in the memory 27. The tire information 50 including the inflation pressure information 56 and the identification information 54 stored in the memory 27 is prepared by the tire information preparing device 26 at intervals of a second predetermined set time which is longer than the interval (that is, the first predetermined set time) for the detection of the tire inflation pressure, and is transmitted from the transmitting antenna 24. When the detection value of the inflation pressure abruptly changes at a rate higher than a predetermined value, the tire information 50 including the inflation pressure information 56 is transmitted each time the tire inflation pressure is detected, in addition to at the intervals of the second predetermined set time.

As shown in FIG. 2, the vehicle body side device 30 includes a receiving antenna 32 which receives the tire information 50 transmitted from the wheel side device 20; a reception control device 34 which mainly includes a computer; an alarm device 36; and the like. The receiving antenna 32, the alarm device 36 and the like are connected to the reception control device 34. The reception control device 34 processes the tire information received by the receiving antenna 32. Nonvolatile memory 37 stores the identification information of the wheel, which is registered when the wheel is attached to the vehicle, a reception control program shown by a flowchart in FIGS. 4A and 4B, and the like. The alarm device 36 issues an alarm indicating an abnormality in the tire inflation pressure, an abnormality in the registered identification information, an abnormality in the tire inflation pressure alarm apparatus itself, or the like, by display or by voice. The reception control device 34 further includes a sensitivity adjusting mechanism 38 which can adjust the sensitivity of the information to be received. In the reception control device 34, predetermined filter process and amplification and the like are performed on the signal provided from the receiving antenna 32, and intermediate frequency process and the like are performed on the signal provided from the receiving antenna 32. Then, the signal is converted into a digital signal by comparing the voltage level of the signal with the reference level by a comparator. In the embodiment, when the voltage level of the signal received by the receiving antenna 32 is detected and the detected voltage level is equal to or lower than the target reception voltage level, the received signal is not processed. Namely, by changing the target reception voltage level using the sensitivity adjusting mechanism 38, the reception sensitivity of a reception device 40 can be changed. In this case, when the target reception voltage level is high, the reception sensitivity is low compared with the case where the target reception voltage level is low. The voltage level of the signal received by the receiving antenna 32 is detected by a terminal of an IC for processing the intermediate frequency, and is compared with the target level by the comparator. In the embodiment, the sensitivity adjusting mechanism is constituted of the terminal, the comparator, a portion for changing the target reception voltage level, and the like.

In the embodiment, the reception device 40 is constituted of the receiving antenna 32 and the reception control device 34. Also, it can be considered that the reception control device 34 also serves as an information processing device. It can also be considered that the reception device 40 is constituted of the receiving antenna 32 and a portion in the reception control device 34, which is related to reception of the tire information 50, and that the information processing device is constituted of the portion in a reception control device 34, which processes the tire information 50.

The mode of the reception device 40 can be switched between an identification information examination mode and an inflation pressure obtaining mode. In the embodiment, the identification information examination mode corresponds to the identification information examination state, and the inflation pressure obtaining mode corresponds to the state where the examination concerning the identification information is not performed. The identification information examination mode is set for performing the examination of whether the identification information is registered properly, in the case where the wheel is attached to the vehicle body at a vehicle production plant, in the case where the wheel is changed at an automobile dealer, or the like.

A connector 65 may be provided which connects a dedicated device 60 to the vehicle body side device 30, and the mode of the reception device 40 may be switched from the inflation pressure obtaining mode to the identification information examination mode according to a switching command from the dedicated device 60 connected to the vehicle body side device 30 via the connector 65. A mode switching operation portion 70 may be provided in the vehicle body side device 30, and the mode switching operation portion 70 may be operated by an examiner. Thus, a mode switching signal is provided to the reception control device 34, and the mode of the reception device 40 is then switched from the inflation pressure obtaining mode to the identification information examination mode. The mode switching signal may be provided to the reception control device 34 using a radio signal. In any of these methods, the mode of the reception device 40 is switched from the inflation pressure obtaining mode to the identification information examination mode according to the mode switching signal provided to the reception control device 34.

In the inflation pressure obtaining mode, the inflation pressure, which is indicated in the inflation pressure information 56 included in the tire information 50 provided from the receiving antenna 32, is read. Then, it is determined whether the inflation pressure is lower than a predetermined set pressure. When it is determined that the inflation pressure is lower than the set pressure, the reception control device 34 activates the alarm device 36. In this case, it is determined whether the identification information 54 included in the tire information 50 received by the receiving antenna 32 matches the identification information stored in the memory 37. When it is determined that the identification information 54 matches the identification information stored in the memory 37, the tire information 50 is processed, since the identification information 54 is transmitted from wheel of the host vehicle. On the other hand, when it is determined that the identification information 54 does not match the identification information stored in the memory 37, the tire information 50 is not processed.

In the embodiment, when the identification information examination mode is set, the sensitivity adjusting mechanism 38 makes the target voltage level of the reception device 40 higher than that when the inflation pressure obtaining mode is set. Accordingly when the identification information examination mode is set, the reception sensitivity of the reception device 40 is lower than that when the inflation pressure obtaining mode is set. Accordingly, in the identification information examination mode, the reception device 40 receives the tire information 50 transmitted from the wheel 12 of the host vehicle. However, the reception device 40 does not receive the tire information 50 transmitted from another vehicle adjacent to the host vehicle.

When the identification information examination mode is set, the reception sensitivity is reduced to the lower limit of the range in which signals can be received, in the state where the rotational speed of the wheel 12 is equal to or lower than a set speed (in the state where the vehicle is almost stopped), and also the vehicle is in the plant. Since rotation of the wheel is stopped, and also the vehicle is not running on an ordinary road, the reception device 40 does not receive noise caused by a large disturbance. In this case, the level of the noise received by the reception device 40 is decided according to a structure of the device, or the like, in advance. In addition, the strength of the signal transmitted from the transmitting antenna 24 is set in advance. Accordingly, the sensitivity of the reception device 40, at which signals can be received, in the identification information examination mode can be decided based on the circumstances, the structure of the device, and the like.

Further, after the examination concerning the identification information is completed, the sensitivity adjusting mechanism 38 increases the sensitivity of the reception device 40. There are many disturbances while the vehicle is running on a road. Accordingly, it is desirable that the sensitivity be higher such that the reception device 40 reliably receives the tire information 50. In the embodiment, the sensitivity adjusting mechanism 38 can be regarded as changing means or processing means.

Figure 4A:
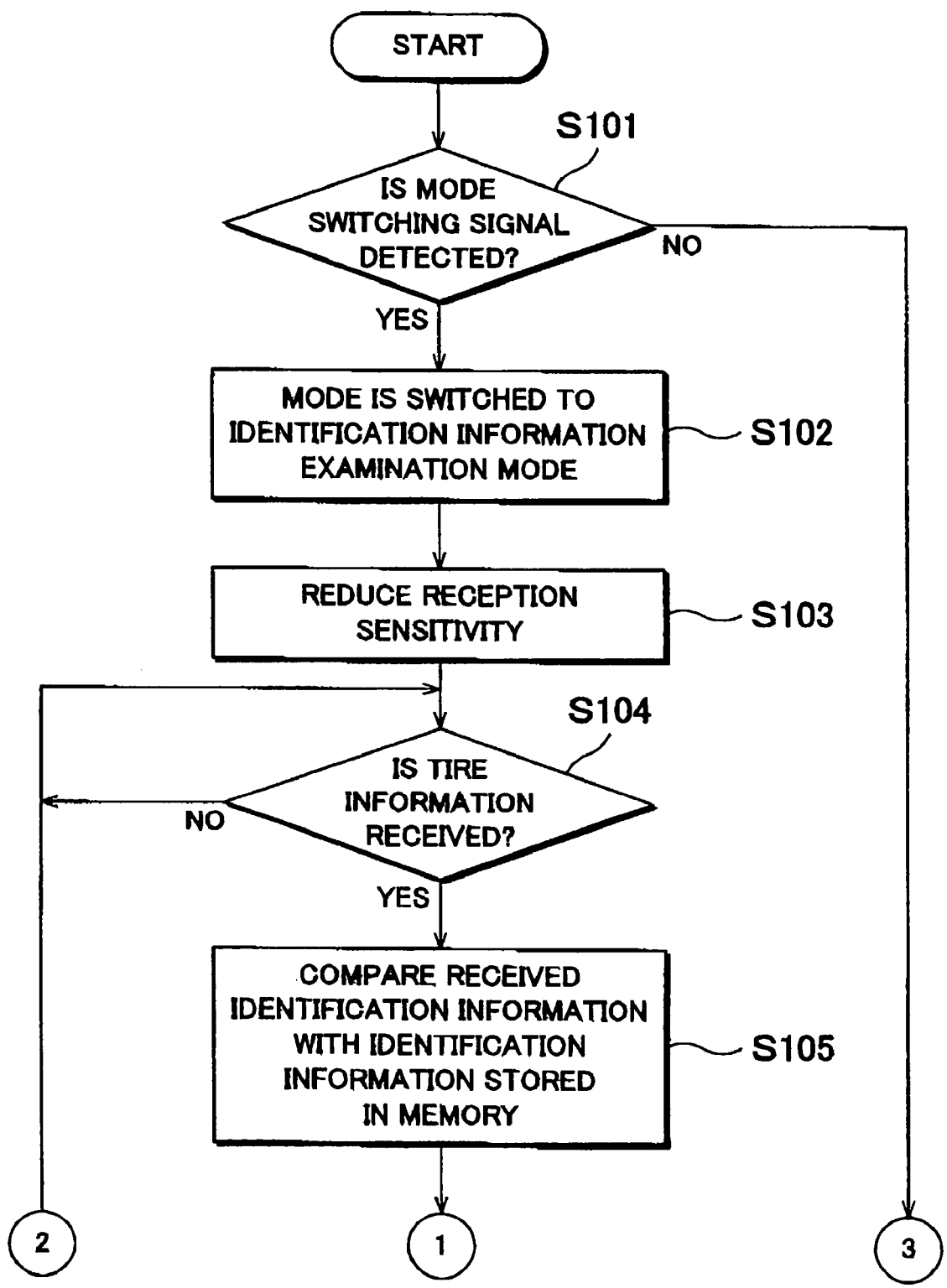

Next, changing the reception sensitivity of the reception device 40 in the identification examination mode, which is a feature of the embodiment, will be described with reference to the flowchart in FIGS. 4A and 4B. The flowchart is performed by the reception control device 34.

In step S101, it is determined whether a mode switching signal is detected. When it is determined that the mode switching signal is detected, the mode of the reception device 40 is switched to the identification information examination mode in step S102. The reception sensitivity of the reception device 40 is reduced by the sensitivity adjusting mechanism 38 in step S103.

Then, it is determined whether the tire information is transmitted from the transmission device 28 in step S104. As described above, the transmission device 28 reliably transmits the tire information at predetermined intervals. Therefore, when the tire information is transmitted from the transmission device 28, the tire information is received by the receiving antenna 32. The tire information may be forcibly transmitted, by using a trigger device 75 which makes the transmission device transmit the tire information using a radio wave, by intentionally reducing the tire inflation pressure, or the like.

In step S105, the identification information 54 included in the received tire information is compared with the identification information stored in the memory 37 of the reception control device. When it is determined that the identification information 54 matches the identification information stored in the memory 37, S107 is then performed. When it is determined that the identification information 54 does not match the identification information stored in the memory 37, the notification of mismatch between the identification information 54 and the identification information stored in the memory 37 is given by the alarm device 36 in step S109.

In step S107, it is determined whether the examination concerning the identification information stored in the memory 74 is entirely completed. When it is determined that the examination is entirely completed, the reception sensitivity is increased by the sensitivity adjusting mechanism 36 in step S108, and the mode of the reception device 40 is returned to the inflation pressure obtaining mode.

As described so far, in the embodiment, the sensitivity of the reception device 40 is reduced in the identification information examination mode. Therefore, it is possible to avoid receiving the identification information transmitted from the transmission device mounted in another vehicle adjacent to the host vehicle in the plant or the like. Namely, the reception specification of the reception device is changed such that the difficulty level of receiving a signal is increased. Accordingly, it is possible to suppress an issue of an unnecessary alarm indicating that the identification information is abnormal, the unnecessary alarm being issued by performing the examination concerning the identification information from the transmission device mounted in the other vehicle. As a result, the time necessary for performing the examination concerning the identification information is reduced, and the examination can be performed accurately.

In the embodiment, the reception sensitivity of the reception device 40 is reduced. However, a plurality of receiving antennas may be provided in the reception device, and the orientations of the receiving antennas may be different between the identification information examination state and the state when the examination is not performed. Also, plural changing means for changing the communication specification may be combined, in order to avoid receiving a radio signal from the transmission device mounted in another vehicle.

Next, an identification information examination method and an information obtaining apparatus according to a second embodiment of the invention will be described. The same portions as those in the first embodiment are assigned with the same reference numerals. Also, the description of the same portions will be omitted entirely or partially.

As shown in FIG. 5, in the embodiment, the transmission device 28 includes a transmission/receiving antenna 25. The transmission device 28 can transmit the tire information and also receive a trigger signal and the like. The tire information preparing device 26 includes a transmission strength adjusting mechanism 29. When the transmission/receiving antenna 25 receives a trigger signal, the transmission strength adjusting mechanism 29 adjusts the strength of the signal transmitted from the transmission device, by performing a transmission control program shown in a flowchart in FIG. 6. In the embodiment, the transmission strength is controlled so as to be in one of a normal mode and a reduction mode. In the normal mode, the transmission strength is sufficient such that transmission of a signal to the reception device is reliably performed. In the reduction mode, the transmission strength is reduced to the lower limit at which the reception device mounted in the host vehicle can receive a signal in the state where noise caused by a disturbance is not received. The reception device 40 includes a transmission/receiving antenna 33. The reception device 40 can transmit a trigger signal to the transmission device of another vehicle adjacent to the host vehicle. When the mode of the reception device 40 is switched to the identification information examination mode, a trigger signal is transmitted so as to reduce the transmission strength of the transmission device of the other vehicle adjacent to the host vehicle.

Next, changing the transmission strength of the transmission device 28 of a host vehicle when another vehicle is in the identification information examination mode, which is a feature of the invention, will be described with reference to a flowchart in FIG. 6. In this case, a flag "F" indicates whether the transmission strength is in the normal mode ("F"="0") or in the reduction mode ("F"="1"), and is stored in the RAM.

In step S201, it is determined whether a trigger signal from another vehicle is received. When it is determined that the trigger signal is not received, step S207 is then performed. On the other hand, when it is determined that the trigger signal is received, the value of the flag "F" is determined in step S202. When it is determined that the value of the flag "F" is "0" ("F"="0"), it is considered that a command for switching the transmission strength to the reduction mode is issued. Accordingly, the transmission strength is reduced in step S203, and the flag "F" is set to "1" ("F"="1") in step S204. On the other hand, when it is determined that the value of the flag "F" is "1" ("F"="1") in step S202, it is considered that a command for switching the transmission strength to the normal mode is issued. Accordingly, the transmission strength is increased in step S205, and the flag "F" is set to "0" ("F"="0") in step S206. In step S207, it is determined whether the signal needs to be transmitted at the present moment. When it is determined that the signal needs to be transmitted at the present moment, the signal is transmitted in step S208. On the other hand, when it is determined that the signal need not be transmitted at the present moment, step S201 is performed again.

As described so far, in the embodiment, when another vehicle adjacent to the host vehicle is in the identification information examination mode, the transmission strength of the transmission device 28 mounted in the host vehicle is reduced. Therefore, it is possible to prevent the other vehicle from receiving the information from the host vehicle, and from performing the examination concerning the identification information. Particularly, in the vehicle production plant, the examination concerning the identification information may be simultaneously performed in plural vehicles. Therefore, if the strength of the signal transmitted from the transmission device is reduced in each of all the plural vehicles adjacent to each other, it is possible to prevent erroneous reception of the information from the transmission device of an adjacent vehicle. As a result, it is possible to perform the examination concerning the identification information accurately.

In the embodiment, the trigger signal is transmitted from the reception device of the vehicle adjacent to the host vehicle. However, the signal may be transmitted from the dedicated trigger device, when the identification information examination process for the vehicle is started in the plant. Also, the trigger signal is not limited to a trigger signal which is provided via the transmission/receiving antenna. The trigger signal may be provided when a contact point of a switch element provided in the transmission device is turned ON by electromagnetic induction action due to a radio wave emitted from the trigger device.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An identification information examination method for an information obtaining apparatus mounted in a vehicle, comprising:

transmitting information including vehicle related information which is related to the vehicle and identification information that allows a transmission source of the vehicle related information to be identified;

receiving the transmitted information;

processing the received information and performing an examination concerning the identification information included in the received information; and when the examination concerning the identification information is performed, changing a reception sensitivity of the reception device by changing at least one of (i) a target reception voltage of the reception device and (ii) an orientation of the reception device for receiving a signal from a first reception sensitivity which is used when an examination concerning the identification information is not performed to a second reception sensitivity which is used when the examination concerning the identification information is performed.

2. An information obtaining apparatus mounted in a vehicle, comprising:

a transmission device that transmits information including vehicle related information which is related to the vehicle and identification information that allows a transmission source of the vehicle related information to be identified;

a reception device that receives the information transmitted from the transmission device;

an information processing device that processes the information received by the reception device and that performs an examination concerning the identification information included in the received information; and when the examination concerning the identification information is performed, a changing device that changes a reception sensitivity of the reception device by changing at least one of (i) a target reception voltage of the reception device and (ii) an orientation of the reception device for receiving a signal from a first reception sensitivity which is used when an examination concerning the identification information is not performed to a second reception sensitivity which is used when the examination concerning the identification information is performed.

3. The information obtaining apparatus according to claim 2, wherein the changing device reduces reception sensitivity of the reception device.

4. The information obtaining apparatus according to claim 3, further comprising:
a reception processing device that increases the reception sensitivity of the reception device, which has been reduced by the changing device in the identification information examination state, after the examination concerning the identification information by the information processing device is completed.

5. The information obtaining apparatus according to claim 2, further comprising:
a storing device that stores the identification information, and
a determining device that compares the identification information stored in the storing device with the identification information received by the reception device.

6. The information obtaining apparatus according to claim 5, further comprising:
an alarm device which generated an alarm indicating a mismatch between the received identification information and the identification information stored in the storing device, when the determining device determines that the received identification information received does not match the identification information stored in the storing device.

7. The information obtaining apparatus according to claim 2, wherein the transmission device is provided in a wheel, and the information obtaining apparatus further includes an information obtaining device for obtaining wheel state information.

8. The information obtaining apparatus according to claim 2, further comprising:
a switching device which connects to the vehicle and transmits, to the changing device, a command for switching a mode from a first mode where the examination concerning the identification information is performed to a second mode where the examination concerning the identification information is not performed.

9. The information obtaining apparatus according to claim 2, further comprising:
a switching device mounted in the vehicle, which transmits a command for switching a mode from a first mode where the examination concerning the identification information is performed to a second mode where the examination concerning the identification information is not performed.

10. The information obtaining apparatus according to claim 2, further comprising:
a trigger device which makes the transmission device transmit the information including the vehicle related information and the identification information.

11. An identification information examination method for an information obtaining apparatus mounted in a vehicle, comprising:
transmitting information including vehicle related information which is related to the vehicle and identification information that allows a transmission source of the vehicle related information to be identified;
receiving the transmitted information;
processing the received information and performing an examination concerning the identification information included in the received information; and
reducing transmission strength of a transmission device mounted in another vehicle adjacent to the vehicle, when the examination concerning the identification information is performed.

12. An information obtaining device mounted in a vehicle, comprising:
a first transmission device that transmits information including vehicle related information which is related to the vehicle and identification information that allows a transmission source of the vehicle related information to be identified;
a reception device that receives the information transmitted from the first transmission device; and
an information processing device that processes the information received by the reception device, that performs an examination concerning the identification information included in the received information, and that reduces transmission strength of a second transmission device mounted in another vehicle adjacent to the vehicle.

13. The information obtaining apparatus according to claim 12, wherein the information processing device transmits, to the another vehicle, a trigger signal for reducing the transmission strength of the second transmission device when a mode is switched from a first mode where an examination concerning the identification information is performed to a second mode where the examination concerning the identification information is not performed, via the first transmission device.

* * * * *